A. W. H. LENDERS.
APPARATUS FOR SEPARATING, WASHING, AND CONCENTRATING MATERIALS.
APPLICATION FILED NOV. 16, 1907.
948,513.
Patented Feb. 8, 1910.
2 SHEETS—SHEET 1.
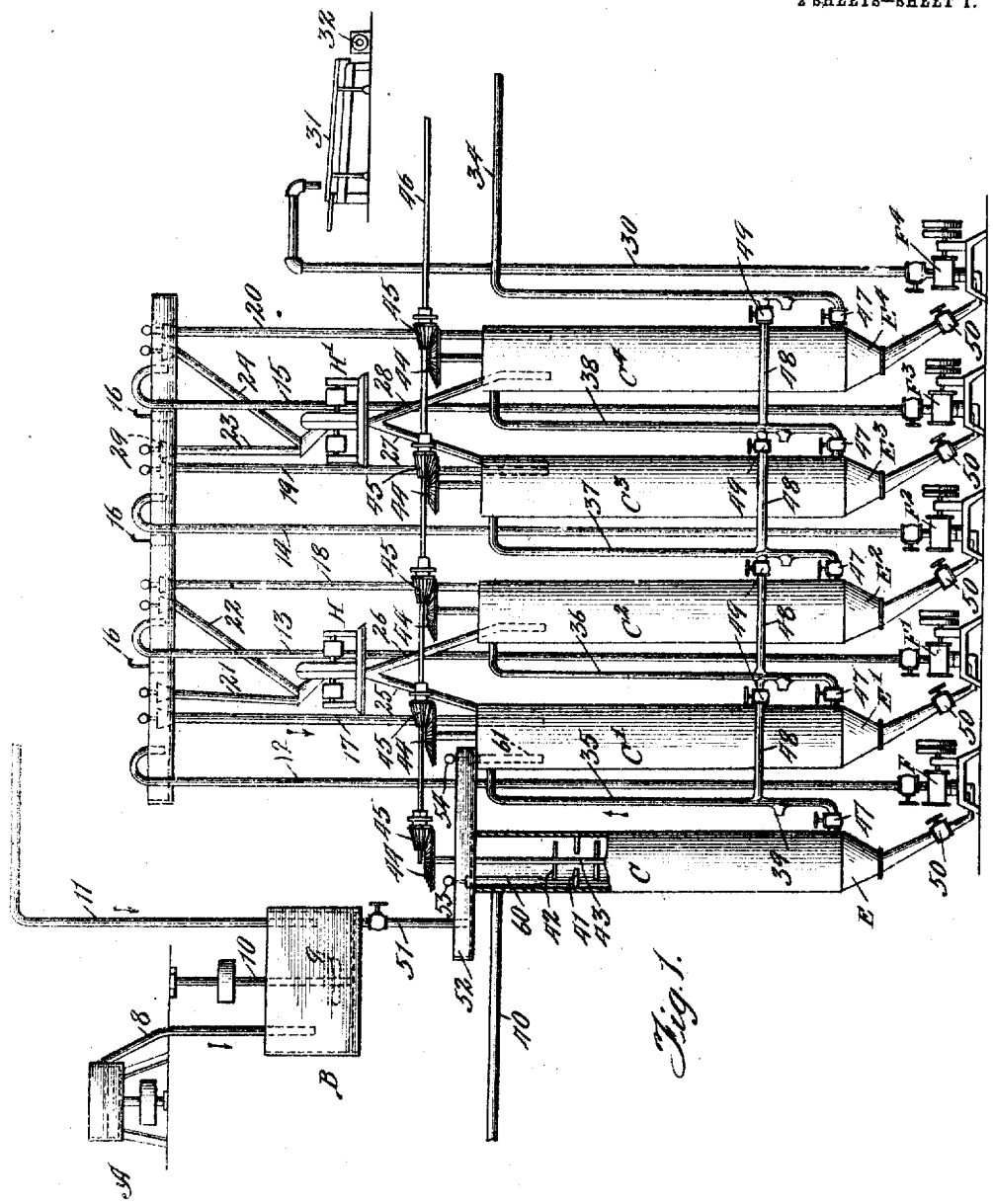

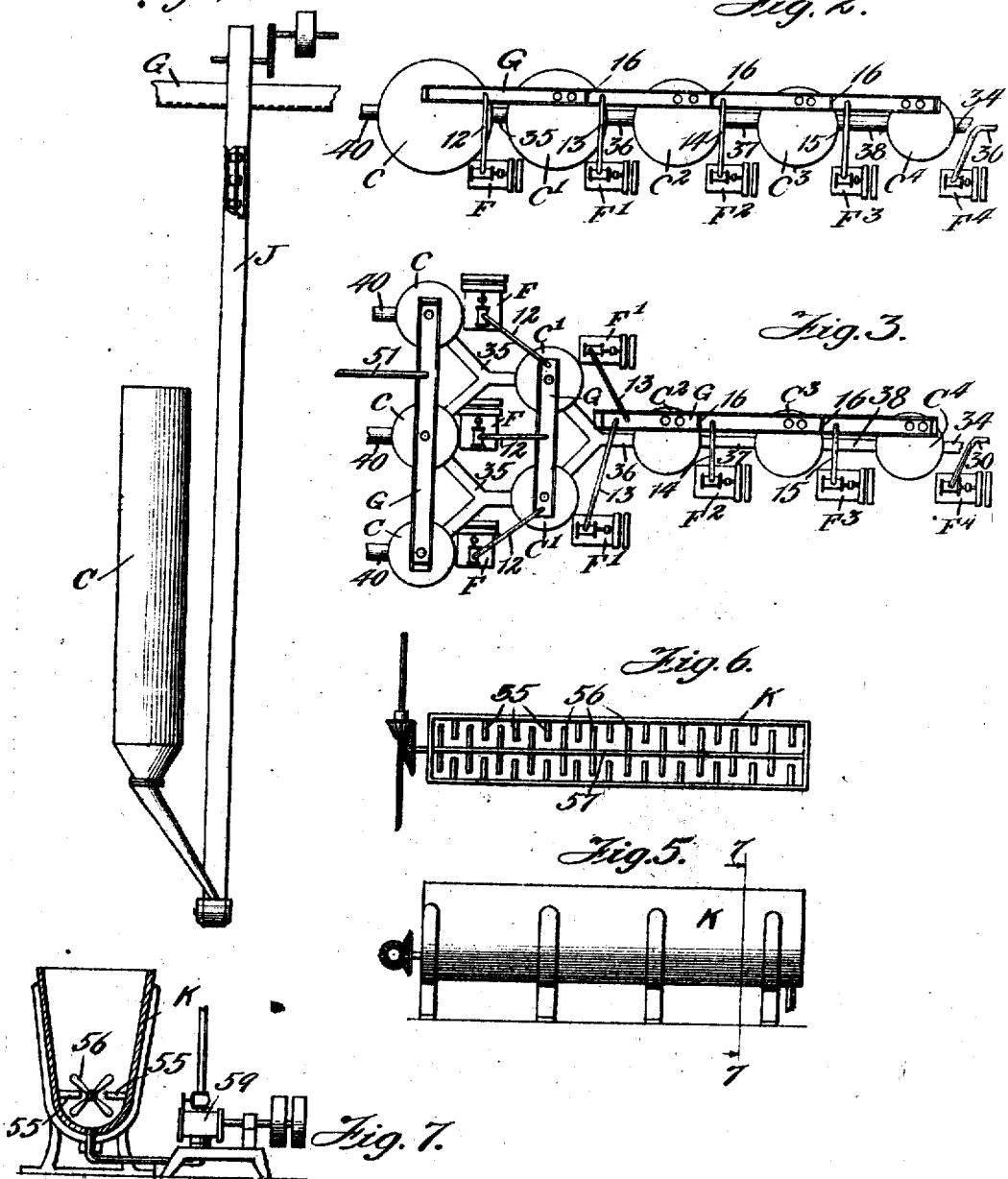

UNITED STATES PATENT OFFICE.

ADOLPH W. H. LENDERS, OF WAUKEGAN, ILLINOIS.

APPARATUS FOR SEPARATING, WASHING, AND CONCENTRATING MATERIALS.

948,513.  Specification of Letters Patent. Patented Feb. 8, 1910.

Application filed November 16, 1907. Serial No. 402,472.

*To all whom it may concern:*

Be it known that I, ADOLPH W. H. LENDERS, a citizen of the United States, residing at Waukegan, in the county of Lake and State of Illinois, have invented certain new and useful Improvements in Apparatus for Separating, Washing, and Concentrating Materials, of which the following is a specification.

My invention relates to separating, washing and concentrating apparatus.

While the apparatus may be employed for the separation of a variety of materials in which the ingredients differ in specific gravity and which are capable of being held in suspension in a liquid, it can be used with particular advantage for the separation of the starch ingredient from the hull in the manufacture of starch from corn. The apparatus will be described as used in that connection.

In making starch according to the method generally used at the present time, the corn, after first being steeped, is disintegrated in iron mills and then conducted to separator tanks, where the germ is floated off. The remaining parts of the kernels of corn, consisting of the hull, starch, gluten and certain cellular or fibrous materials, are next ground in French bur mills and are then passed through silk shaking sieves of No. 9 mesh, the larger particles tailing off and being carried to the feed house. The starch liquor going through these sieves is next conducted to a similar set of shaking sieves, ordinarily No. 17 or No. 20, in order to remove the finely divided fibrous matter which was able to pass through the coarser mesh of the No. 9 sieves. The process of separating up to this stage of the proceeding requires a very large amount of water, an amount of water, in fact, which leaves the product too dilute for running it over the starch tables, which otherwise would be the next step in the process. To concentrate the liquor it is, therefore, conducted from the sieves to settling tanks, known as cone settlers, the starch concentrating in the bottom of these tanks while the dilute water is drawn off from the top. The liquor remaining in the tanks is then stirred and run over the starch or settling tables where the starch is collected and the gluten tails off.

The use of the apparatus above described is attended with several disadvantages. The silk shaking sieves are very expensive to install and also to maintain, because of the high speed at which the sieves are run, a speed which often reaches 480 revolutions a minute. The buildings themselves in which the shakers are installed are injured also by the constant vibration of the shakers.

It is one of the objects of my invention to provide a form of apparatus which will do away with the first set of shakers.

Another object is to eliminate the cone settlers by using a form of separating apparatus which will require only so much water as is necessary to give the product the proper density.

The use of the first set of sieves is attended with another disadvantage in that a considerable amount of starch always tails off with the bran, a loss due in part to the fact that there are particles of starch too large to go through the sieve and in part to the fact that the bran in tailing off envelops or entrains a portion of the finely divided starch. The use of the cone settlers also involves a loss of starch as the dilute water drawn off from the top of the settlers always contains a certain amount of starch, which consequently goes to waste. Another disadvantage involved in the use of the cone settlers which, perhaps, is more detrimental, is the fact that they necessitate an interruption in the process of making the starch.

My invention contemplates a form of separating apparatus which will accomplish the separating, washing and concentrating steps in a single operation and more effectively than has been done by the shakers and cone settlers. By use of this apparatus the process of manufacturing starch may be a continuous one.

My invention is illustrated in the accompanying drawings, wherein—

Figure 1 is a side elevation of an installation. Fig. 2 is a diagram illustrating one arrangement of cells in the battery of separators. Fig. 3 is a diagram illustrating another arrangement of the same. Fig. 4 is a detail illustrating a modification in which a conveyer is used in place of a pump and its connections. Fig. 5 is a detail of a modified form of separator in elevation. Fig. 6 is a plan view of the same; and Fig. 7 is a section on the line 7—7 of Fig. 5 looking in the direction of the arrows.

Like characters of reference indicate like parts in the several figures of the drawings.

A represents a bur mill discharging by a pipe 8 into a mixing tank B in which is an agitator 9 on a shaft 10. The mass from the bur mill may be mixed with water or light starch liquor which may be conducted to the mixing tank through the pipe 11.

C, C', C², C³ and C⁴ are a series of separating tanks which preferably terminate in the funnels E, E', E², E³ and E⁴ which are connected with the pumps F, F', F², F³ and F⁴, which serve to force the settlings of the several separators into the next succeeding ones of the battery. The bran settling in the separators may be conducted directly from one separator to the next or it may be put through disintegrators between successive washing steps in order to loosen any particles of starch which may adhere to the particles of bran. I have shown, for example, pipes 12, 13, 14 and 15 leading from the pumps to a distributing trough G divided into compartments by the gates 16 and from which lead the pipes 17, 18, 19 and 20 to successive separators; and from which also lead pipes 21, 22, 23 and 24 to the disintegrators H, H', the latter discharging into the separators through pipes 25, 26, 27 and 28. These pipes are controlled by valves 29, so that the bran may be sent through the disintegrators or not, as desired. The bran leaves the last separator passing through the pipe 30 to the screen or equivalent device 31, where the water is taken out. From here it may be conveyed to the feed house by conveyer 32.

By introducing water or light starch liquor into separator C⁴ through pipe 34, a flow of the liquid in the separators is obtained which is opposed to the force of gravity and which has sufficient velocity to float off the starch without overcoming the gravity of the bran, which is heavier when the material is in its wetted condition. The cells C, C', etc., may be connected in any desired manner, so as to permit a constant flow of the liquor from one to another. I have shown the cells connected by pipes 35, 36, 37 and 38. These pipes are provided with connections 39 by means of which starch liquor derived from other steps in the manufacture may be introduced into the separators. By regulating the amount of water which flows through pipe 34 or the amount or density of the starch liquor introduced into the system by means of these pipes, the liquor which becomes concentrated as it flows from C⁴ to C may be made to issue from the system at just the proper density for the settling tables. This liquor flows from the separator C through the pipe 40. The best results are obtained by continuously agitating the liquid in the receptacles so as to wash out the starch from the bran. This agitation may be accomplished in any desired manner. Preferably I provide the separator tanks with stationary arms 41 between which revolve the agitators 42 on shaft 43, the shafts in the several separators being provided with bevel gears 44 driven by pinions 45 on the shaft 46. The agitators may be driven either intermittently first in one direction and then in another or else continuously in the same direction. If the former method is pursued, the shaft 46 will be provided with any well known form of reversing apparatus. For convenience, the connections between the cells of the battery are such that a single cell may be cut out for purposes of repair and the like. Pipes 34, 35, 36, 37 and 38 are, therefore, provided each with a valve 47, these pipes being connected by a series of pipes 48 having valves 49. The funnels E, E', etc., are likewise provided with valves 50. In order that the first of the separators may be by-passed in case of necessity, the pipe 51, which conducts the material from the mixing tank, may lead to a distributing trough 52 which discharges through pipes 60 or 61 either into separator C or separator C', according to whether valves 53 and 54 are opened or closed. The starch liquor as it passes from cell to cell becomes more and more concentrated. To overcome the tendency of the starch liquor when thus concentrated to carry with it particles of bran from the last of the cells, I prefer to construct my apparatus so as to gradually diminish the velocity of flow of the starch liquor as it proceeds toward the outlet. This may be done either by making the cells of gradually increasing diameter, which is the arrangement I have illustrated in the diagram of Fig. 2; or arranging the cells in groups of increasing number, which arrangement is shown in Fig. 3. In either case, the volume of the flowing liquid is gradually increased with a consequently proportional decrease in velocity.

The use and operation of my preferred form of apparatus is as follows: The grain, after the germ is floated off, is ground in the bur mill A, or some equivalent device, and is then preferably run into the mixing tank B, where it may be mixed with fresh water or with light starch water derived from some other stage of the manufacture. From here it is conducted into the separating tanks in the manner described. The constant agitation of the liquid in these tanks separates the starchy material adhering to the bran. Fresh water or starch liquor may be admitted to the tanks through the pipes 34, 35, 36, 37 and 38 causing a steady, regulatable flow through the tanks in opposition to the force of gravity. The liquor flowing through the system becomes gradually concentrated. By regulating the amount of water introduced into the system, the density of the liquor flowing out of tank C may be perfectly controlled. The bran settling in each of the tanks is pumped or otherwise conveyed into the next tank or system so that by the time the bran is passed through the system it is thoroughly washed.

In Fig. 4 is shown a modification in which a bucket elevator conveyer J is substituted for the pumps and its connections for conducting the bran from a cell of the battery to the distributing trough.

In Figs. 5, 6 and 7 I have illustrated a modified form of apparatus in which the separating tanks are in horizontal position. While I do not consider that this form of apparatus would give such good results, a more or less effective separation could be obtained by such apparatus. In these figures K represents a trough in which are the stationary arms 55 and the rotating agitators 56 on the shaft 57. The bran is discharged from the trough through a pipe 58 and is pumped into the next trough by a pump 59, the starch flowing through suitable pipes from trough to trough in the manner similar to that shown in the preferred form of apparatus illustrated in Fig. 1.

I wish it to be understood that I do not desire to limit myself to the particular forms, devices and constructions herein shown, as obvious modifications will occur to those skilled in the art.

I claim:

1. In the apparatus for separating the constituents of a mixture, the combination with a receptacle, of means for introducing the material into said receptacle, said receptacle having an inlet for liquid in the lower part of said receptacle and an overflow outlet in the upper part thereof, agitating means within said receptacle comprising stationary members, and rotating members arranged between the stationary members.

2. In the apparatus for separating the constituents of a mixture, the combination with a system of connected receptacles, of means for introducing a material to be separated into said system, means whereby said liquid may be caused to flow through said system, agitators in said receptacles, means for removing the settlings from said receptacles and causing them to pass through the next succeeding receptacles of the system, and disintegrating devices arranged so that the settlings pass through the same in going from one receptacle to the next.

3. In the apparatus for separating the constituents of a mixture, the combination with a system of connected receptacles, of means for continuously introducing the material together with a liquid into said system, and means whereby liquid may be caused to flow through said system in opposition to the force of gravity, said receptacles being constructed so as to diminish the velocity of the liquid therein in the direction of its flow.

4. In the apparatus for separating the constituents of a mixture, the combination with a series of receptacles, of means for continuously introducing the material to be separated together with a liquid into said receptacles, conduits leading from the upper ends of the receptacles to the lower end of the next adjoining receptacles, means whereby liquid may be caused to flow through said receptacles in opposition to the force of gravity, and means for removing the settlings from said receptacles and causing them to pass through the remaining receptacles in the series in a direction reverse to the flow of the liquid, and agitating means in said receptacles.

5. In the apparatus for separating the constituents of a mixture, the combination with a series of receptacles, of connecting pipes leading from the bottom of the first receptacle of the series to the upper part of the next receptacle and so on throughout the series, a supply pipe for the material to be separated leading into the first receptacle, a water supply pipe leading to the lower part of the last receptacle of the series, whereby liquid may be caused to flow from the last receptacle to the first receptacle of the series, an outlet pipe leading from the upper part of the first receptacle, and means for giving a churning agitation to the liquid in the receptacles except at the top of each receptacle.

6. In the apparatus for separating the constituents of a mixture, the combination with a series of receptacles, of connecting pipes leading from the bottom of the first receptacle of the series to the upper part of the next receptacle and so on throughout the series, a supply pipe for the material to be separated leading into the first receptacle, a water supply pipe leading to the lower part of the last receptacle of the series, whereby liquid may be caused to flow from the last receptacle to the first receptacle of the series, an outlet pipe leading from the upper part of the first receptacle, means for giving a churning agitation to the liquid in the receptacle except at the top of each receptacle, and means for withdrawing the settlings from the first receptacle and introducing them into the upper part of the next receptacle of the series, and so on throughout the series.

7. In the apparatus for separating the constituents of a mixture, the combination with a series of receptacles, of connecting pipes leading from the bottom of the first receptacle of the series to the upper part of the next receptacle and so on throughout the series, a supply pipe for the material to be separated leading into the first receptacle, a water supply pipe leading to the lower part of the last receptacle of the series, whereby liquid may be caused to flow from the last receptacle to the first receptacle of the series, an outlet pipe leading from the upper part of the first receptacle, means for giving a churning agitation to the liquid in the receptacle except at the top of each receptacle, means for withdrawing the settlings from the first receptacle and introducing them into the upper part of the next receptacle of the series, and so on throughout the series, a series of disintegrators, and means whereby the settlings when withdrawn from the receptacles may be caused to pass at will either through the disintegrators to the next receptacles of the series or directly from one receptacle to the next.

8. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, and a starch outlet at the upper part of said first tank.

9. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, a starch outlet at the upper part of said first tank, and means for giving a churning agitation to the liquid in the several tanks.

10. In apparatus for separating the starch element from the bran in the manufacture of starch, the combination with means for grinding the grain, of a series of separating tanks having grain outlets at the bottom, means for introducing the ground grain into the first tank of the series below the surface of the liquid therein, pipes connecting the lower parts of the several tanks above the bran outlets with the upper part of the succeeding tanks, respectively, below the level of the liquid therein, means for introducing water into the last tank of the series so as to create a flow through the tanks in reverse order and against the force of gravity, means for giving the mixture of bran, water and starch a churning agitation, and a starch outlet at the upper part of said first tank.

11. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, a starch outlet at the upper part of said first tank, the tanks being of successively decreasing volume from the first to the last of the series, for the purpose described.

ADOLPH W. H. LENDERS.

Witnesses:
PERCIVAL H. TRUMAN,
H. L. PECK.

---

Corrections in Letters Patent No. 948.

It is hereby certified that in Letters Patent No. 948,513, granted February 8, 1910, upon the application of Adolph W. H. Lenders, of Waukegan, Illinois, for an improvement in "Apparatus for Separating, Washing, and Concentrating Materials," errors appear in the printed specification requiring correction as follows: Page 3, line 53, the word "said" second occurrence, should be canceled; line 67, after the word "whereby" the word *said* should be inserted, and line 79, the word "end" should read *ends;* and that the said Letters Patent should be read with these corrections therein that the same may conform to the record of the case in the Patent Office.

Signed and sealed this 1st day of March, A. D., 1910.

[SEAL.]
C. C. BILLINGS,
*Acting Commissioner of Patents.* receptacle of the series to the upper part of the next receptacle and so on throughout the series, a supply pipe for the material to be separated leading into the first receptacle, a water supply pipe leading to the lower part of the last receptacle of the series, whereby liquid may be caused to flow from the last receptacle to the first receptacle of the series, an outlet pipe leading from the upper part of the first receptacle, means for giving a churning agitation to the liquid in the receptacle except at the top of each receptacle, means for withdrawing the settlings from the first receptacle and introducing them into the upper part of the next receptacle of the series, and so on throughout the series, a series of disintegrators, and means whereby the settlings when withdrawn from the receptacles may be caused to pass at will either through the disintegrators to the next receptacles of the series or directly from one receptacle to the next.

8. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, and a starch outlet at the upper part of said first tank.

9. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, a starch outlet at the upper part of said first tank, and means for giving a churning agitation to the liquid in the several tanks.

10. In apparatus for separating the starch element from the bran in the manufacture of starch, the combination with means for grinding the grain, of a series of separating tanks having grain outlets at the bottom, means for introducing the ground grain into the first tank of the series below the surface of the liquid therein, pipes connecting the lower parts of the several tanks above the bran outlets with the upper part of the succeeding tanks, respectively, below the level of the liquid therein, means for introducing water into the last tank of the series so as to create a flow through the tanks in reverse order and against the force of gravity, means for giving the mixture of bran, water and starch a churning agitation, and a starch outlet at the upper part of said first tank.

11. In apparatus for separating the starch element from the bran in the manufacture of starch, the combination with means for grinding the grain, of a series of separating tanks having bran outlets at the bottom, means for introducing the ground grain into the first tank of the series, pipes connecting the lower parts of the several tanks with the upper parts of the next succeeding tanks, respectively, means for removing the bran from the bran outlets of the several tanks and introducing it into the next succeeding tanks near the top thereof, means for introducing water into the last tank of the series so that it will flow upwardly through the several tanks in reverse order, a starch outlet at the upper part of said first tank, the tanks being of successively decreasing volume from the first to the last of the series, for the purpose described.

ADOLPH W. H. LENDERS.

Witnesses:
PERCIVAL H. TRUMAN,
H. L. PECK.

---

Corrections in Letters Patent No. 948

It is hereby certified that in Letters Patent No. 948,513, granted February 8, 1910, upon the application of Adolph W. H. Lenders, of Waukegan, Illinois, for an improvement in "Apparatus for Separating, Washing, and Concentrating Materials," errors appear in the printed specification requiring correction as follows: Page 3, line 53, the word "said" second occurrence, should be canceled; line 67, after the word "whereby" the word *said* should be inserted, and line 79, the word "end" should read *ends;* and that the said Letters Patent should be read with these corrections therein that the same may conform to the record of the case in the Patent Office.

Signed and sealed this 1st day of March, A. D., 1910.

[SEAL.] C. C. BILLINGS,
Acting Commissioner of Patents.